Nov. 30, 1948.  J. A. HAGEN ET AL  2,455,248

BALLOON

Filed Oct. 25, 1944

INVENTORS
JOHN A. HAGEN
LAURENCE PRENDERGAST
BY EDMUND L. GREGOR

John C. Kerr
ATTORNEY

Patented Nov. 30, 1948

2,455,248

UNITED STATES PATENT OFFICE 2,455,248

BALLOON

John A. Hagen, Glen Rock, Laurence Prendergast, Passaic, and Edmund L. Gregor, Ramsey, N. J., assignors to Molded Latex Products, Inc., Passaic, N. J., a corporation of New Jersey Application October 25, 1944, Serial No. 560,240

3 Claims. (Cl. 244—31)

This invention relates to a barrage balloon. The balloon is made up of a casing of strong flexible non-elastic material and a leak-proof inflatable bladder which is provided with end pieces of rigid solid material, such as metal.

The outer skin or casing is made of gussets or strips of cloth such as nylon sewed together and the bladder is seamless rubber. When filled with gas the balloon will lift a weight which is as great or greater than itself to a height of several hundred feet under normal atmospheric conditions. The wall of the bladder may be about five to eight thousandths of an inch thick when uninflated and the body portions about one-to-one and a half thousandths of an inch when inflated, while the end portions are not so thin as the body portions are when inflated, for a purpose to be explained.

Conventional barrage balloons consist of an envelope made up of a layer or layers of fabric coated or impregnated with rubber or rubber-like substances and securely seamed and cemented at the seams to make them gas-tight. This makes a bulky balloon which has a dead weight free lift ration of 2 to 1 or higher.

One of the objects of this invention is to obviate the difficulties encountered with the older sorts of balloons, and to make one which, while light, will be comparatively rugged to withstand the forces encountered in use and at the same time will have a dead weight free lift ratio of less than 2 to 1. To accomplish these ends our balloon has both a thin-walled and seamless rubber bladder and a casing, this casing being preferably of light strong fabric such as nylon. It has been found in practice that such a balloon can lift a greater weight than the conventional fabric balloons of the same cubic capacity.

Furthermore, it has heretofore been impractical or unknown to make seamless rubber bladders in the shape of a barrage balloon and of such size as would provide appreciable lifting capacity and at the same time be impervious to gases and be rugged.

This invention may be understood from the description in connection with the accompanying drawing in which Fig. 1 is a section through a cylinder and container that may be used in forming the bladder;

Figure 1:
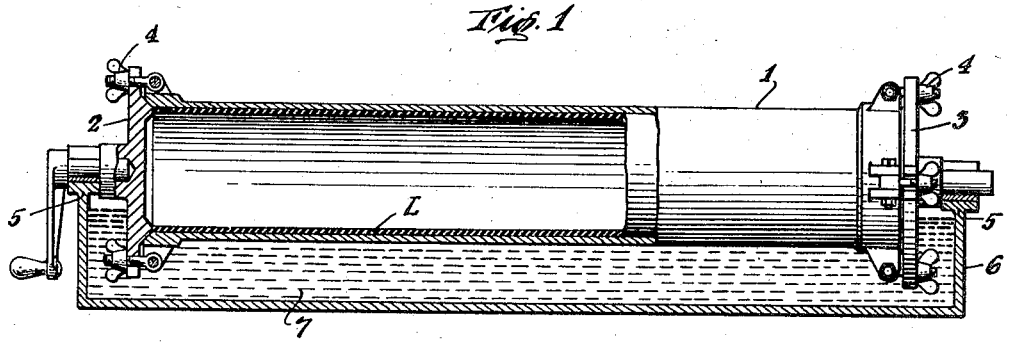

In carrying out the invention either natural or synthetic rubber may be used for making the bladder. The invention will be particularly described in connection with the use of sunlight-resistant neoprene latex for making the bladder.

An aluminum cylinder 1 which may for example be about a foot in diameter, six feet long and have a wall thickness of about a quarter of an inch, has its inner surface smooth and polished. End plates 2 and 3 are provided for closing the ends of this cylinder and may be kept in place by wing nuts 4.

4000 c. c. of neoprene latex compound which has been made heat-sensitive by the addition of 480 c. c. of approximately 10% aqueous ammonium nitrate solution is introduced into cylinder 1 and the end plates 2 and 3 are clamped in place. Cylinder 1 is then placed on bearings 5 on container 6 so that the longitudinal elements of its inner surface are horizontal. Container 6 has previously been filled with water at 140°–180° F. to such a height that cylinder 1 is immersed to a depth of several inches, thereby heating cylinder 1 and its contents. As soon as cylinder 1 is placed on bearings 5 it is rotated at a speed of 10 to 20 R. P. M. to distribute the latex uniformly over its inner surface. The rotation is continued until all of the latex compound has gelled. The heat of the water in container 6 is transferred through cylinder 1 to the latex compound which gels in thin layers which build up one on another until all of the latex compound is gelled to a cylinder of uniform wall thickness. This requires about two minutes. The cylinder may be rotated at a speed of 200 to 500 R. P. M., thereby distributing the latex compound to a uniform layer by centrifugal force. The mold is then cooled to room temperature which may be done by rotating it in a similar way in cold water.

The soft flexible cylindrical gel L is then removed from the mold.

Figure 2:
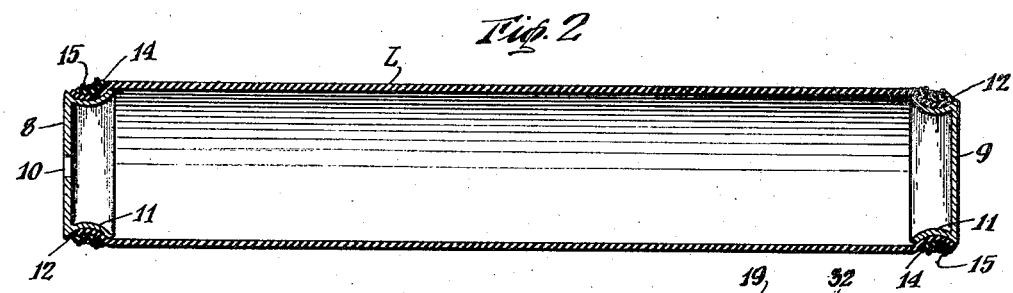
Fig. 2 is a section showing the bladder removed and metal discs in place.

Aluminum discs 8 and 9, Fig. 2, are then attached to the open ends of the cylindrical gel L to close them. One of these discs is provided with a central opening 10 through which air may be introduced by a nozzle for inflating the cylinder.

The discs 8 and 9 are provided with inwardly extending flanges 11 having annular grooves 12 around them. The ends of the cylinder L overlap these flanges and are bound in place by wrapping cloth tape 14 around where the grooves 12 are located. Cords 15 may then be wrapped around the tapes and tied in place.

Figure 3:
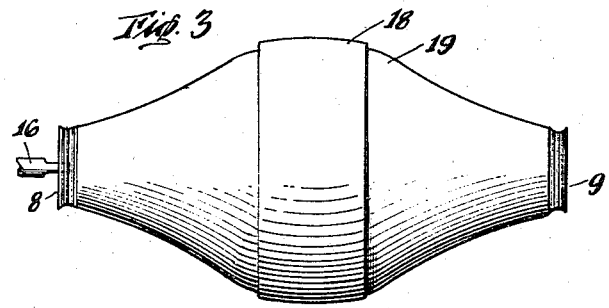
Fig. 3 is a side view of the bladder on a smaller scale showing a part of the process.

The cylindrical gel or bladder is then inflated by introducing air from a nozzle 16 (Fig. 3) that fits in the hole 10 while the bladder rests upon a flat surface such as the floor or a table. In order to prevent weak or thin spots that may be present in the bladder from inflating too rapidly and bursting before other parts are sufficiently inflated, non-elastic cloth girdles, such as the one indicated at 18, that may be made of cheesecloth for example, are put on the inflated bladder 19 to restrict the diameter to which expansion is permitted to about five feet. Each of the girdles may be about three feet long and the first one is placed over the portion of the bladder that first reaches about a five foot diameter during the inflating operation. Other girdles, not shown on the drawing, are added as the inflation proceeds with edges overlapping about three inches until the bladder is sufficiently inflated. During the inflating time the bladder is turned so that different portions rest upon the floor as the inflation proceeds.

The position of the first inflation bulge is controlled by pressing by hand upon places where the bulge is not desired while the air is being introduced. It is desirable to cause the first bulge to appear near the center as this causes the thickness of the cylindrical portion of the wall to be more uniform and reduces the danger of the bladder bursting during the introduction of the air.

By this process the bladder is inflated with substantially even wall thickness and uniform diameter along the cylindrical portion thereof leaving the end portions with greater thickness particularly where they are attached to the discs 8 and 9, thus reducing the danger of rupture where the discs are attached. The bladder is then about five feet in diameter and about twenty-six feet long. The bladder is then permitted to dry in the air for a few hours. It is then partially deflated and a thin film of talc is applied inside and out to prevent portions of the surface thereof that might be brought into contact with other portions from adhering to each other.

The aluminum discs 8 and 9 are removed and the bladder may be pre-shrunk when desired by heating it to 50°-70° C. for about 15 minutes.

Figure 4:
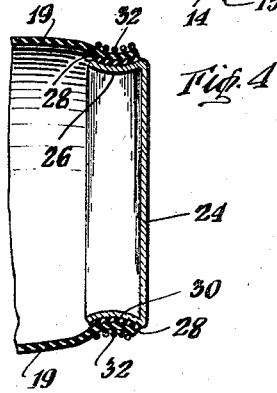
Fig. 4 is a section showing how a metal disc is permanently attached to the bladder.

Two permanent aluminum discs, such as the disc 24 shown in Fig. 4, each having a flange 26 corresponding to the flanges 11 on discs 8 and 9 are securely anchored in the openings at opposite ends of the bladder 19. As indicated on a larger scale in Fig. 4, this is done by first wrapping a few plies of rubber tape 28 around in the groove in the flange 26 of each disc 24 and then inserting the two flanges into openings at opposite ends of the bladder 19, where the neoprene had already been correspondingly shaped by flanges 11 to fit into the annular grooves 30 in the flanges 26. The ends of the bladder are cemented to the rubber tapes 28 by means of neoprene cement. Then layers of cord 32 are wrapped around the ends of the bladder 19 to hold the discs 24 securely in place with their flanges 26 fitting in the correspondingly shaped ends of the bladder.

Figure 5:
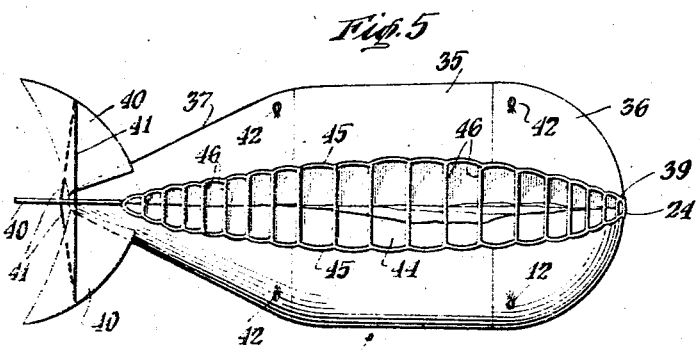
Fig. 5 is a bottom view of the completed device.

The casing 33 (Fig. 5) for the balloon is made of nylon which is not water or gas-proof. It consists of a cylindrical portion 35, a hemispherical head portion 36 and a truncated cone tail portion 37. It is provided with openings 39 in the tail and head portions respectively. The bladder 19 is introduced into the casing through the opening 38 in the tail portion. The forward disc 24 of the bladder is pulled through the opening in the nose 39 of the casing 33 and is fastened to the head end of the casing by a draw string that is tightened around the outside of the flange 26 of disc 24. The disc in the other end of the bladder 19 is secured in the end 38 of the casing in a similar way. The balloon is inflated in the usual way. The nylon casing 33 is made up of strips.

Fins 40 connected by braces 41 are provided on the tail portion of the balloon and an anchoring rope or cord of nylon, not shown, is attached to the balloon at several places 42 in the known way.

A flexible insert 44 extends longitudinally of the casing 33 with its edges attached to the edges 45 along longitudinal seams in this casing. Transverse elastic cords 46 are provided to bring the edges 45 closer together when needed to adjust the diameter of the casing 33.

What is claimed is:

1. A balloon comprising an elongated casing of flexible material having a hemispherical head portion, a cone-shaped tail portion and a cylindrically-shaped intermediate portion, an elongated bladder of elastic material in said casing, discs of rigid material having longitudinally curved flanges projecting inwardly into said bladder at the ends thereof and held in place by cords wrapped around the outside of the ends of said bladder end hermetically binding the ends of said bladder to said flanges.

2. The balloon of claim 1 in which rubber tape is installed in the grooves in said curved flanges between the ends of said bladder and said flanges.

3. The balloon of claim 1 in which rubber tape is installed in the grooves in said curved flanges between the ends of said bladder and said flanges and the ends of said bladder are cemented to said rubber tape.

JOHN A. HAGEN.
LAURENCE PRENDERGAST.
EDMUND L. GREGOR.

REFERENCES CITED

The following references are of record in the file of this patent:

UNITED STATES PATENTS

| Number | Name | Date |
| --- | --- | --- |
| 965,021 | Schouboe | July 19, 1910 |
| 1,046,501 | Schweinert | Dec. 10, 1912 |
| 1,924,236 | Friedberg | Aug. 29, 1933 |
| 1,931,243 | Wackman | Oct. 17, 1933 |
| 2,230,192 | Ross | Jan. 28, 1941 |

FOREIGN PATENTS

| Number | Country | Date |
| --- | --- | --- |
| 660 | Great Britain | 1914 |
| 252,248 | Great Britain | May 20, 1926 |
| 368,719 | Germany | Feb. 9, 1923 |